United States Patent Office 3,341,569
Patented Sept. 12, 1967

3,341,569
PRODUCTION OF BIARYL COMPOUNDS THROUGH FREE RADICAL REACTION WHEREIN THE FREE RADICAL SOURCE IS AN AROMATIC CARBOXYLIC ACID
William H. Starnes, Jr., Baytown, Tex., assignor, by mesne assignments, to Esso Research and Engineering Company, Elizabeth, N.J., a corporation of Delaware
No Drawing. Filed Oct. 1, 1962, Ser. No. 227,551
15 Claims. (Cl. 260—469)

This invention relates to a method for producing aryl or aroyloxy radicals from aromatic acids, continuously and within a liquid phase reaction medium. More specifically, the present invention relates to a novel process of continuously forming and reacting aryl or aroyloxy radicals within a liquid phase in contact with a coreactant. In another aspect, the present invention relates to a method of producing biphenyls. Biphenyls are useful as high temperature lubricants and as research intermediates. Some biphenyls, such as carbomethoxy biphenyls, are useful modifiers for alkyd resins and plasticizers. The present invention is directed to the carrying out of a liquid phase, catalytic free-radical reaction wherein the free-radical source is an aromatic carboxylic acid. The acid, catalyst and a coreactant solvent comprise a liquid phase reaction mass, and oxygen is added continuously thereto. The initiator is added during the course of the reaction, either continuously or periodically, to maintain an effective amount of the initiator in the reaction mass throughout the reaction.

By the practice of the prior art, the use of free-radical initiators in organic reactions has ordinarily been limited to the initial portion of the reaction only, with the intent that the thus initiated reaction should continue without further addition of the initiator. However, in connection with the present invention, it has been found that addition of small amounts of initiator at the beginning of the reaction does not yield the desired result. Further, aromatic carboxylic acids have heretofore not been thought to be suitable sources of aryl or aroyloxy radicals. By the present invention, aromatic, carboxylic acids are made suitable for such use.

By the practice of the present invention, an aromatic carboxylic acid (as the free-radical source) is contacted in the liquid reaction phase with a free-radical initiator, a cobalt catalyst, and oxygen. A coreactant liquid is maintained in the liquid reaction phase to "trap" the free radicals by reacting with them as they are formed. The initiator is continuously or periodically added to maintain an effective amount in solution in the liquid phase. By this process, free radicals are continuously presented for reaction within the liquid reaction phase.

The cobalt catalyst may suitably comprise compounds which are soluble within the reaction liquid phase at the reaction temperatures. Generally, they will be cobaltous compounds. Exemplary catalysts are cobalt naphthenate, cobalt stearate, cobalt octanoate, cobalt acetylacetonate, etc. There are no limits on the amount of catalyst which may be employed, although it is desirable to have at least about 0.1 weight percent of catalyst present in the reaction liquid so that reasonable yields of the desired products may be obtained without the use of excessive amounts of initiator.

Suitable free-radical initiators for use in the present process are found in compounds such as di-t-butyl peroxide, cumyl hydroperoxide, dicumyl peroxide, peracids such as peracetic, performic, perbenzoic, etc., and, in general, any organic compound which would form peroxidic compounds under the oxidizing conditions utilized in the practice of this invention. During the reaction, a total of at least one-half mol of initiator per mol of acid-free radical source must ordinarily be added in order to obtain practical conversions to the desired products. It is to be stressed that the initiator is added continuously or in small portions rather than all at once. It is preferred to maintain the concentration of initiator in the liquid reaction mass within the range of 0.01% to 20%. The optimum concentration of initiator will depend, of course, on the particular initiator employed and the particular reaction desired.

The source of the free aryl or aroyloxy radical in the proceess of the present invention is an aromatic acid which is free of substituent groups which are readily oxidizable under the reaction conditions, or which are capable of facile reaction with the free radicals which arise from the initiator. For example, suitable sources of the aryl or aroyloxy radicals are aromatic compounds such as benzoic acid, halogen-substituted benzoic acids, t-butyl-substituted benzoic acids, nitro-substituted benzoic acids, biphenyl carboxylic acids, naphthoic acids, and heterocyclic acids such as the pyridine, furan, and thiophene carboxylic acids. Aliphatic acids are expressly excluded because of their reactivity with oxygen under the reaction conditions. As mentioned, it is critical in the practice of the present invention that the source of the aryl or aroyloxy radical not contain readily oxidizable substituents, because in this event the oxidation of those groups would compete with the formation and utilization of the desired aryl and aroyloxy radicals. Therefore, as used in this application, the term "aromatic carboxylic acid" shall be deemed to exclude those acids which contain readily oxidizable constituents.

The coreactant solvent which is to be used to trap the evolved aryl or aroyloxy radicals may suitably be any material which is reactive toward these radicals, which is liquid at the reaction temperature, and which is not readily oxidized under the conditions of the present reaction (i.e., not at a rate such that this oxidation reaction would compete with the formation of the aryl or aroyloxy radicals in the manner proscribed with respect to the free-radical source). Exemplary coreactant solvents are benzene, chlorobenzene, the isomeric dichlorobenzenes, nitrobenzene, t-butyl benzene, pyridine, quinoline, biphenyl, naphthalene, and methyl benzoate. The mol ratio of coreactant to the acid free-radical source is at least about 2 to 1 but may be made as high as desired.

The reaction is carried out at temperatures and pressures sufficient to maintain the reaction mixture in the liquid phase. Temperatures within the range of 120° C. to 300° C. may be used, preferably within the range of 170° C. to 200° C. It is desirable to maintain the temperature near the reflux temperature of the liquids used at the pressure employed. Any pressure, atmospheric, subatmospheric or superatmospheric may be utilized.

Oxygen, either pure or in admixture with inert gases, such as in air, is added at a rate such that the liquid phase remains saturated with oxygen. The actual rate required will depend on the particular reaction which is being performed.

In the practice of the present invention, it is preferred to remove easily vaporized materials continuously from the reaction zone. This allows the maintenance of higher temperatures in the reaction zone and also removes water, which may act as a catalyst deactivator. A recycle stream may be utilized for returning high-boiling material to the reaction zone, in which case it is preferred to pass the recycle stream over a drying agent such as calcium sulfate, calcium chloride, silica gel or other well-known drying agents.

The generated aryl or aroyloxy free radicals are utilized by trapping them by reaction with the coreactant solvent. The nature of the final product obtained by this coreaction depends upon the nature of the free radical source and of the coreactant solvent. It has been found in a preferred mode of this invention that biaryl compounds may be formed by utilizing benzoic acid as the radical source and o-dichlorobenzene as the coreactant solvent. As exemplary of biaryl materials which may be formed by the practice of the present invention, the following examples are set forth.

Example 1

In order to show the production of biphenyls from benzoic acid and o-dichlorobenzene, the following run was made. A solution of 24.4 g. (0.20 mol) of benzoic acid and 5.0 g. of cobaltous naphthenate (6% cobalt) in 200 ml. (1.77 mols) of o-dichlorobenzene was prepared in a one-liter Morton flask equipped with a high speed Teflon-coated stirrer. This solution was refluxed at 172–180° C. for 7.0 hours with vigorous stirring in the presence of pure oxygen (28 liters/hr.) while 77.8 ml. (0.42 mol) of di-t-butyl peroxide was added at a fairly constant rate by means of a pulse pump. The condensate was percolated through a column packed with anhydrous calcium sulfate before being returned to the reaction vessel or being withdrawn from the system. Condensate was removed periodically in order to maintain the desired temperature. At the end of the 7.0 hour period, the solution was cooled to about 25° C., filtered to remove a small amount of dark solid, and extracted repeatedly with 5% aqueous sodium hydroxide. The extracted solution was water washed, dried over anhydrous calcium sulfate, and then concentrated by distilling off most of the solvent at atmospheric pressure. The residual liquid was analyzed by gas chromatography and found to contain 16.1 g. of a mixture of 2,3- and 3,4-dichlorobiphenyl. This represents a 36% yield based on the benzoic acid charged. Sixty-three percent of the product was the 2,3-isomer, whereas 37% was the 3,4-isomer of dichlorobiphenyl.

Example 2

A solution of benzoic acid and o-dichlorobenzene was reacted in the presence of di-t-butyl peroxide under conditions substantially the same as in Example 1, except that the catalyst was cobaltous stearate (3.20 g.) rather than cobaltous naphthenate. After 7.0 hours of reaction under conditions similar to those in Example 1, and after work-up of the reaction product in a manner similar to that in Example 1, a product containing 26% yield of 2,3- and 3,4-dichlorobiphenyl, based on the benzoic acid charged, was obtained. The distribution of the isomers was 64% 2,3-dichlorobiphenyl and 36% 3,4-dichlorobiphenyl.

Example 3

The reaction of Example 1 was duplicated using cobaltous octanoate (5.0 g. of material containing 6% cobalt) under conditions similar to those of Example 1. The product contained 65% 2,3-dichlorobiphenyl and 35% 3,4-dichlorobiphenyl, the yield being 42% based on the benzoic acid charged.

Example 4

A solution of benzoic acid (24.4 g., 0.20 mol) in 200 ml. (1.77 mols) of dichlorobenzene was treated with 33 liters/hr. of oxygen and 72.1 ml. (0.39 mol) of di-t-butyl peroxide, which was periodically added in a substantially uniform manner over the 7.0 hour period during which the reaction was accomplished. The temperature during the 7.0 hours was held between 172° C. and 180° C.

Three percent yield of product based on benzoic acid charged was obtained, containing 63% 2,3-dichlorobiphenyl and 37% 3,4-dichlorobiphenyl.

Example 5

The reaction of benzoic acid in nitrobenzene to produce nitrobiphenyls was accomplished in the following manner. A solution of 24.4 g. (0.20 mol) of benzoic acid and 5.0 g. of cobaltous naphthenate (6% cobalt) in 200 ml. (1.95 mols) of nitrobenzene was contacted for 7.0 hours at 171° C. to 174° C. with 27 liters/hr. of oxygen and 77.3 ml. (0.42 mol) of di-t-butyl peroxide continuously and uniformly added over the 7.0 hour period. The mixture was worked up in the manner described with respect to Example 1.

Analysis of the product indicated a 10% yield, based on benzoic acid charged, of nitrobiphenyls. The relative percentages of the isomers in the product were 57% 2-nitrobiphenyl, 15% 3-nitrobiphenyl, and 28% 4-nitrobiphenyl. The identification of these materials was confirmed by gas chromatography and mass spectral analysis, as compared with authentic samples of the isomers.

Example 6

A solution of 24.4 g. (0.20 mol) of benzoic acid and 5.0 g. of cobaltous naphthenate (containing 6% cobalt) in 200 ml. (1.29 mols) of t-butylbenzene was contacted with oxygen at a rate of 30 liters/hr. and 94.0 ml. (0.51 mol) of di-t-butyl peroxide, which was added continuously over the reaction period. The reaction was carried out at 159° C. to 169° C. for 7.0 hours. The mixture was worked up in the manner set forth in Example 1, and the product analyzed. It was found that a mixture of 2-, 3-, and 4-t-butylbiphenyl was formed in 12.5% yield, based on the benzoic acid charged. The distribution of the isomers was 21% 2-t-butylbiphenyl, 52% 3-t-butylbiphenyl, and 27% 4-t-butylbiphenyl.

Example 7

To illustrate the use of an ester as the coreactive liquid, a solution of 24.4 g. (0.20 mol) of benzoic acid and 5.0 g. of cobaltous naphthenate (containing 6% cobalt) in 200 ml. (1.60 mols) of methyl benzoate was contacted continuously over a 7.0 hour period with 30 liters/hr. of oxygen and 77.0 ml. (0.42 mol) of di-t-butyl peroxide added at a substantially uniform rate over the entire reaction period. The temperature during the 7.0 hour reaction time ranged between 192° C. and 200° C.

Work-up of the product by the procedure set forth in Example 1 showed that a 50% yield of carbomethoxybiphenyls was obtained, based on the benzoic acid charged. The isomer distribution was 55% 2-carbomethoxybiphenyl, 22% 3-carbomethoxybiphenyl, and 23% 3-carbomethoxybiphenyl. A 6% yield, based on the benzoic acid charged, of biphenyl was also recovered.

Example 8

A mixture of 25.0 g. (0.16 mol) of p-chlorobenzoic acid, 5.45 g. of cobaltous naphthenate (containing 6% cobalt), and 200 g. (1.36 mols) of p-dichlorobenzene was contacted with 24.9 liters per hour of oxygen at a temperature within the range from 138° C. to 165° C. for a period of 6.5 hours. Substantially continuously and uniformly over the reaction time of 6.5 hours, 60.9 ml. (0.330 mol) of di-t-butyl peroxide was added. The reaction mixture was cooled to a temperature of about 25° C., diluted with an equal volume of benzene, and worked up as discussed in Example 1. A neutral, high-boiling organic residue was obtained, which upon fractionation produced 2.64 g. of material boiling at 122° C. (at 2.5 mm. mercury pressure). The main constituent of this fraction was shown by mass spectral analysis to be a trichlorobiphenyl, and recrystallization from absolute ethanol gave 0.35 g. (0.9%) of 2,4′,5-trichlorobiphenyl, melting point 64–65° C. This material was shown to be identical with an authentic sample of the trichlorobiphenyl by means of mixed melting point and infrared spectral determinations.

Example 9

A solution of 25.0 g. (0.126 mol) of biphenyl-2-carboxylic acid, 5.0 g. of cobaltous naphthenate (material containing 6% cobalt), and 200 ml. (1.77 mols) of o-dichlorobenzene was treated in the usual manner with 25.0 liters/hr. of oxygen over a reaction period of 7.0 hours at 172° C. to 179° C. Di-t-butyl peroxide (66.5 ml., 0.360 mol) was continuously and uniformly added over the 7.0 hour reaction period. The mixture was cooled to about 25° C., filtered, and extracted thoroughly with saturated aqueous sodium bicarbonate, to form an equeous layer and an organic layer. The organic layer was separated and then stirred at reflux temperature with 200 ml. of 5% aqueous sodium hydroxide for 20 minutes. The product of the reflux reaction was separated into an aqueous layer and an organic layer, the organic portion being extracted with an additional 100 ml. of 5% sodium hydroxide. The sodium hydroxide aqueous layers were then combined, acidified to a pH of 2 with concentrated hydrochloric acid and extracted with several portions of ether until the ether layer remained water-white. The combined ether layers were extracted with 250 ml. of saturated aqueous sodium bicarbonate, dried over anhydrous calcium sulfate, and then evaporated to dryness to afford 5.3 g. of crude 3,4-benzocoumarin. This represented a yield of 21%, based on the biphenyl 2-carboxylic acid charged. Recrystallization from petroleum ether (boiling point 30–60° C.) afforded the pure material (a yield of about 10%) in two crops having melting points of 93–94° C. and 91–93° C. The identity of this material was established by mixed melting-point determinations and infrared spectra.

The organic fraction remaining after extraction with sodium hydroxide was shown by mass spectral analysis to contain a considerable amount of dichloroterphenyl (probably a mixture of the two possible isomers). An additional constituent, isolated by fractionation at reduced pressure, was biphenyl (5% yield based on the starting acid charged).

As is shown by the above specified examples, a novel and useful process has been provided for producing aryl and aroyloxy radicals, and a method of trapping these radicals in a novel manner to produce biaryl compounds.

The invention should not be limited to the scope of the specific examples given, but only by the appended claims.

I claim:

1. A method of carrying out a liquid phase, free-radical reaction wherein the free radical is generated from an aromatic carboxylic acid free of readily oxidizable substituents which comprises continuously adding oxygen and a free-radical initiator over the course of the reaction to a reaction mixture containing said aromatic carboxylic acid, a coreactant solvent, and a cobalt catalyst, whereby said initiator is maintained in said liquid phase in a concentration of at least 0.01 weight percent, and wherein said free-radical initiator is chosen from the group consisting of organic peroxides and peracids, said coreactant solvent is chosen from the group consisting of benzene, chlorobenzene, the isomeric dichlorobenzenes, nitrobenzene, t-butylbenzene and methyl benzoate, and said cobalt catalyst is chosen from the group consisting of cobalt naphthenate, cobalt stearate, cobalt octoate, and cobalt acetylacetonate.

2. A method in accordance with claim 1 wherein the free-radical initiator is added in a mol ratio of 0.5:1 with respect to said aromatic carboxylic acid.

3. A method in accordance with claim 1 wherein the initiator is a peroxide.

4. A method of producing a biphenyl which comprises contacting a benzene carboxylic acid free of readily oxidizable substituents, a coreactive solvent, chosen from the group consisting of benzene, chlorobenzene, the isomeric dichlorobenzene, nitrobenzene, t-butylbenzene, and methyl benzoate, a cobalt catalyst chosen from the group consisting of cobalt naphthenate, cobalt stearate, cobalt octoate, and cobalt acetylacetonate, oxygen, and a free-radical initiator chosen from the group consisting of organic peroxides and peracids in a reaction zone at a temperature within the range from about 120° C. to about 300° C., and at a pressure sufficient to maintain the reactants in the liquid phase, said free-radical initiator being added to said reaction zone during the course of said reaction to maintain the concentration thereof at least 0.01% by weight in the liquid phase.

5. A method in accordance with claim 4 wherein the total initiator added amounts to 0.5 mol of initiator per mol of aromatic carboxylic acid.

6. A method of forming biphenyls which comprises forming a solution of a benzene carboxylic acid free of readily oxidizable substituents and a liquid solvent coreactant chosen from the group consisting of benzene, chlorobenzene, the isomeric dichlorobenzene, nitrobenzene, t-butylbenzene, and methyl benzoate in a mol ratio of at least 1 part of acid to 2 parts of coreactant, with at least about 0.1 weight percent cobalt catalyst chosen from the group consisting of cobalt naphthenate, cobalt stearate, cobalt octoate, and cobalt acetylacetonate, contacting said solution with oxygen at a rate sufficient to maintain saturation of the liquid phase with oxygen, at a temperature within the range from about 120° C. to about 300° C. and a pressure sufficient to maintain the reaction mixture in the liquid phase, and continuously adding to said reaction mixture a free-radical initiator chosen from the group consisting of organic peroxides and peracids in amounts sufficient to maintain a concentration in the reaction mixture of at least 0.01% of said free-radical initiator, said initiator being added during the course of said reaction in a total amount of at least 0.5 mol of initiator per mol of acid free-radical source.

7. A method in accordance with claim 6 wherein the free-radical initiator is chosen from the group consisting of di-t-butyl peroxide, cumyl hydroperoxide, dicumyl peroxide, and peracids, and the free-radical source is chosen from the group consisting of benzoic acid, halogen substituted benzoic acids, t-butyl substituted benzoic acids, nitro substituted benzoic acids, biphenyl carboxylic acids, naphthoic acids, pyridine, furan and thiophene carboxylic acids.

8. A method of obtaining dichlorobiphenyls which comprises forming a solution of benzoic acid, dichlorobenzene, and cobaltous naphthenate, and contacting said solution at a temperature within the range from 172° C. to 180° C. for a period of about 7.0 hours while passing oxygen through said solution, and while continuously adding at least 0.5 mol of di-t-butyl peroxide per mol of benzoic acid to said reaction mixture.

9. A method in accordance with claim 8 wherein the total amount of di-t-butyl peroxide added is about 2 mols per mol of benzoic acid, and the ratio of dichlorobenzene to benzoic acid is about 9 mols per mol.

10. A method in accordance with claim 9 wherein the catalyst is cobaltous stearate.

11. A method in accordance with claim 9 wherein the catalyst is cobaltous octanoate.

12. A method of producing nitrobiphenyls which comprises forming a solution of benzoic acid, a cobalt catalyst chosen from the group consisting of cobalt naphthenate, cobalt stearate, cobalt octoate, and cobalt acetylacetonate, and nitrobenzene in the approximate ratio of 10 mols of nitrobenzene per mol of benzoic acid, with a concentration of about 2% by weight of the cobalt catalyst, contacting said solution at a temperature within the range of 170° C. to 175° C. for a period of 7.0 hours with about 6 mols per hour of oxygen per mol of acid, while adding continuously over said reaction period about 2 mols of di-t-butyl peroxide per mol of benzoic acid, whereby nitrobiphenyls are produced.

13. A method of producing t-butylbiphenyls which comprises forming a solution of t-butylbenzene and benzoic acid in a mol ratio of about 6.5:1, with about 2.5% by weight of a cobalt catalyst chosen from the group consisting of cobalt naphthenate, cobalt stearate, cobalt octoate, and cobalt acetylacetonate, maintaining said solution at a temperature within the range of about 159° C. to about 169° C. for a period of about 7.0 hours, while adding about 7 mols per hour of oxygen per mol of acid, and while adding continuously over said reaction period about 2.5 mols of di-t-butyl peroxide per mol of benzoic acid, whereby t-butylbiphenyls are obtained.

14. A method of producing carbomethoxybiphenyls which comprises forming a solution of benzoic acid and methyl benzoate in a mol ratio of about 8 mols of methyl benzoate per mol of benzoic acid, said solution containing about 2% by weight of a cobalt catalyst chosen from the group consisting of cobalt naphthenate, cobalt stearate, cobalt octoate, and cobalt acetylacetonate, contacting said solution at a temperature within a range from about 190° C. to about 200° C. over a period of about 7.0 hours with about 7 mols of oxygen per hour per mol of acid, while adding continuously about 2 mols of di-t-butyl peroxide per mol of benzoic acid, whereby carbomethoxybiphenyls are obtained.

15. A method of obtaining trichlorobiphenyl which comprises forming a solution of p-chlorobenzoic acid and p-dichlorobenzene in a mol ratio of about 7 mols of p-dichlorobenzene per mol of p-chlorobenzoic acid, with a cobalt catalyst chosen from the group consisting of cobalt naphthenate, cobalt stearate, cobalt octoate, and cobalt acetylacetonate, having a concentration of about 2 weight percent in said solution, and contacting said solution at a temperature from about 138° C. to about 165° C. for a period of 6.5 hours with about 7 mols per hour per mol of acid of oxygen while continuously adding about 2.0 mols of di-t-butyl peroxide per mol of acid to said reaction mixture, whereby trichlorobiphenyl is obtained.

References Cited

UNITED STATES PATENTS 3,042,708   7/1962   Mills et al. ---------- 260—469
3,074,963   1/1963   Siegel et al. -------- 260—343.2

LORRAINE A. WEINBERGER, *Primary Examiner.*

NICHOLAS S. RIZZO, *Examiner.*

JAMES A. PATTEN, THOMAS L. GALLOWAY, JR.,
*Assistant Examiners.*